(12) United States Patent
Bergh

(10) Patent No.: US 9,451,390 B2
(45) Date of Patent: Sep. 20, 2016

(54) MAGNETIC BATTERY SAVER

(71) Applicant: Sony Corporation, Tokyo (JP)

(72) Inventor: Jonas Bergh, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/360,753

(22) PCT Filed: Jun. 24, 2013

(86) PCT No.: PCT/IB2013/055184
§ 371 (c)(1),
(2) Date: May 27, 2014

(87) PCT Pub. No.: WO2014/207505
PCT Pub. Date: Dec. 31, 2014

(65) Prior Publication Data
US 2016/0100274 A1   Apr. 7, 2016

(51) Int. Cl.
H04B 5/00 (2006.01)
H04B 7/00 (2006.01)
H04B 1/38 (2015.01)
H04W 4/00 (2009.01)
H04M 1/725 (2006.01)
H04W 52/02 (2009.01)
G01C 17/02 (2006.01)
G01V 3/00 (2006.01)
G01C 17/28 (2006.01)

(52) U.S. Cl.
CPC ............. H04W 4/008 (2013.01); G01C 17/02 (2013.01); G01V 3/00 (2013.01); H04M 1/7253 (2013.01); H04W 52/0251 (2013.01); G01C 17/28 (2013.01); H04M 2250/04 (2013.01)

(58) Field of Classification Search
CPC ..................................................... H04W 4/008
USPC ............................................ 455/574, 343, 2
See application file for complete search history.

(56) References Cited

U.S. PATENT DOCUMENTS

2006/0079180 A1   4/2006   Sinivaara
2012/0170177 A1   7/2012   Pertuit et al.

FOREIGN PATENT DOCUMENTS

EP   1653715 A2   5/2006
EP   2302884 A1   3/2011

OTHER PUBLICATIONS

International Search Report and Written Opinion; Apr. 3, 2014; issued in International Application No. PCT/IB2013/055184.
International Preliminary Report on Patentability; Jan. 7, 2016; issued in International Patent Application No. PCT/IB2013/055184.

Primary Examiner — Tilahun B Gesesse
(74) Attorney, Agent, or Firm — James C. Edwards; Moore & Van Allen PLLC

(57) ABSTRACT

The invention is directed to systems, methods and computer program products for activating a mobile device application. An exemplary method comprises: storing a threshold change; determining a change in magnetic field using a compass located in a mobile device; comparing the change in magnetic field to the threshold change; determining whether the change in magnetic field is greater than or equal to the threshold change; and in response to determining the change in magnetic field is greater than or equal to the threshold change, activating a mobile device application.

16 Claims, 5 Drawing Sheets

MAGNETIC BATTERY SAVER

BACKGROUND

A mobile device has a limited battery life. Some mobile device functions require a lot of battery power, and therefore need to be activated only when required. Therefore, there is a need to conditionally activate mobile device functions in order to preserve battery life.

BRIEF SUMMARY

Embodiments of the invention are directed to systems, methods and computer program products for activating mobile device applications. An exemplary method comprises: storing a threshold change; determining a change in magnetic field using a compass located in a mobile device; comparing the change in magnetic field to a threshold change; determining whether the change in magnetic field is greater than or equal to the threshold change; and in response to determining the change in magnetic field is greater than or equal to the threshold change, activating a mobile device application.

In some embodiments, the mobile device application comprises a near-field communication (NFC) application.

In some embodiments, the compass is located in a NFC tag or chip.

In some embodiments, the compass is located in the mobile device but not in an NFC tag or chip.

In some embodiments, the compass comprises at least two compasses.

In some embodiments, activating the mobile device application reduces a charge associated with a power source located in the mobile device.

In some embodiments, the mobile device comprises a portable mobile communication device.

In some embodiments, the mobile device application comprises a display application or an image-capturing application.

In some embodiments, the compass comprises at least two compasses, and the change in magnetic field comprises an average change in magnetic field detected by the at least two compasses.

In some embodiments, the change in magnetic field is triggered by bringing the mobile device in close proximity to an external magnet.

In some embodiments, the external magnet is associated with a point-of-sale terminal.

In some embodiments, the external magnet is associated with a readable indicia terminal.

In some embodiments, activating the mobile device application comprises activating the mobile device application for a predetermined period.

In some embodiments, the method further comprises deactivating the mobile device application after the predetermined period.

In some embodiments, the method further comprises deactivating the mobile device application after the predetermined period based on the magnetic field detected by the compass at the end of the predetermined period.

In some embodiments, the method further comprises continuing to activate the mobile device application after the predetermined period based on the magnetic field detected by the compass at the end of the predetermined period.

In some embodiments, determining the change in magnetic field comprises determining an amount of displacement of a magnetic pointer associated with the compass.

In some embodiments, the method further comprises initiating presentation of a graphical user interface on a display of the mobile device upon activation of the mobile device application.

In some embodiments, an apparatus is provided for activating mobile device applications. The apparatus comprises a memory; a processor; and a module stored in the memory, executable by the processor, and configured to: store a threshold change; determine a change in magnetic field using a compass located in a mobile device; compare the change in magnetic field to a threshold change; determine whether the change in magnetic field is greater than or equal to the threshold change; and in response to determining the change in magnetic field is greater than or equal to the threshold change, activate a mobile device application.

In some embodiments, a computer program product is provided for activating mobile device applications. The computer program product comprises a non-transitory computer-readable medium comprising a set of codes for causing a computer to: store a threshold change; determine a change in magnetic field using a compass located in a mobile device; compare the change in magnetic field to a threshold change; determine whether the change in magnetic field is greater than or equal to the threshold change; and in response to determining the change in magnetic field is greater than or equal to the threshold change, activate a mobile device application.

BRIEF DESCRIPTION OF THE DRAWINGS

Figure 1:
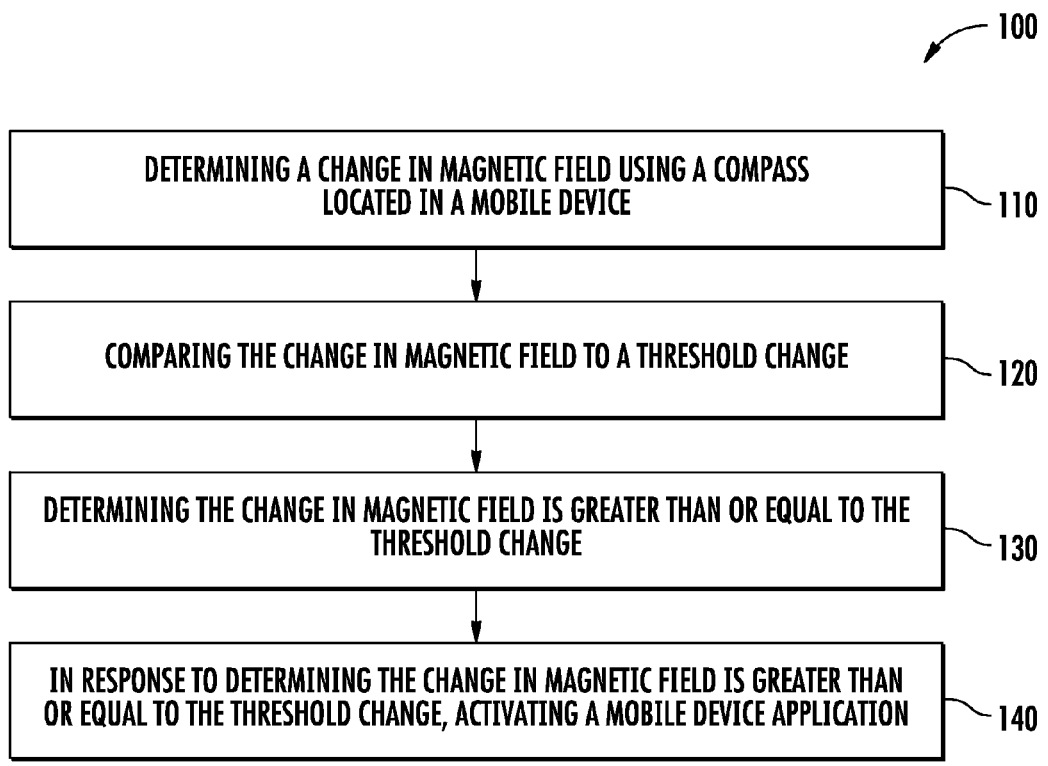
Figure 2:
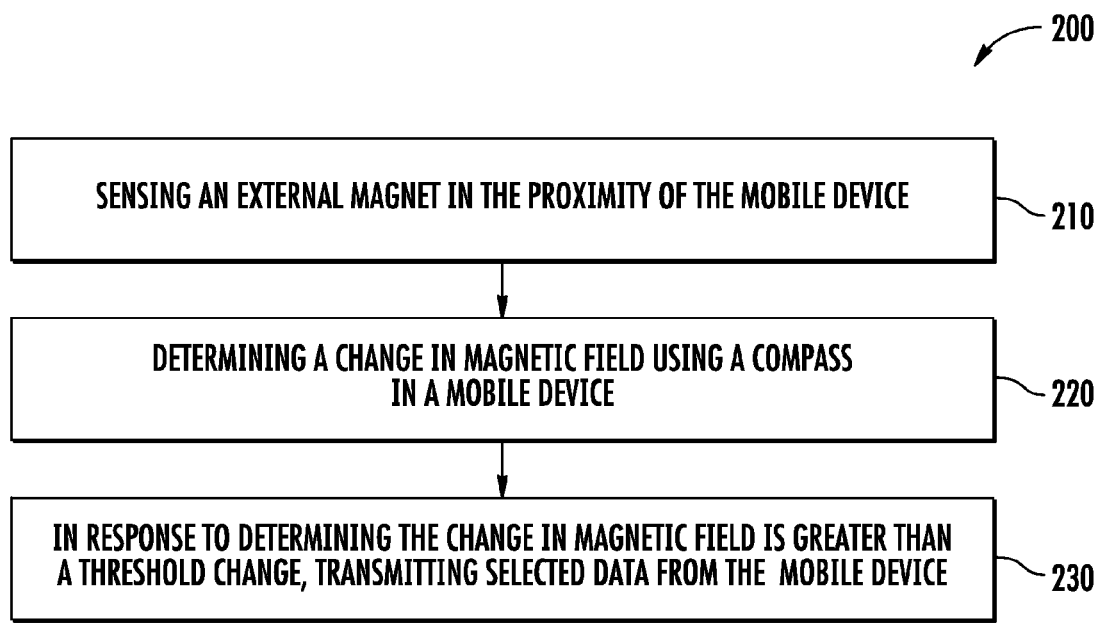
Figure 3:
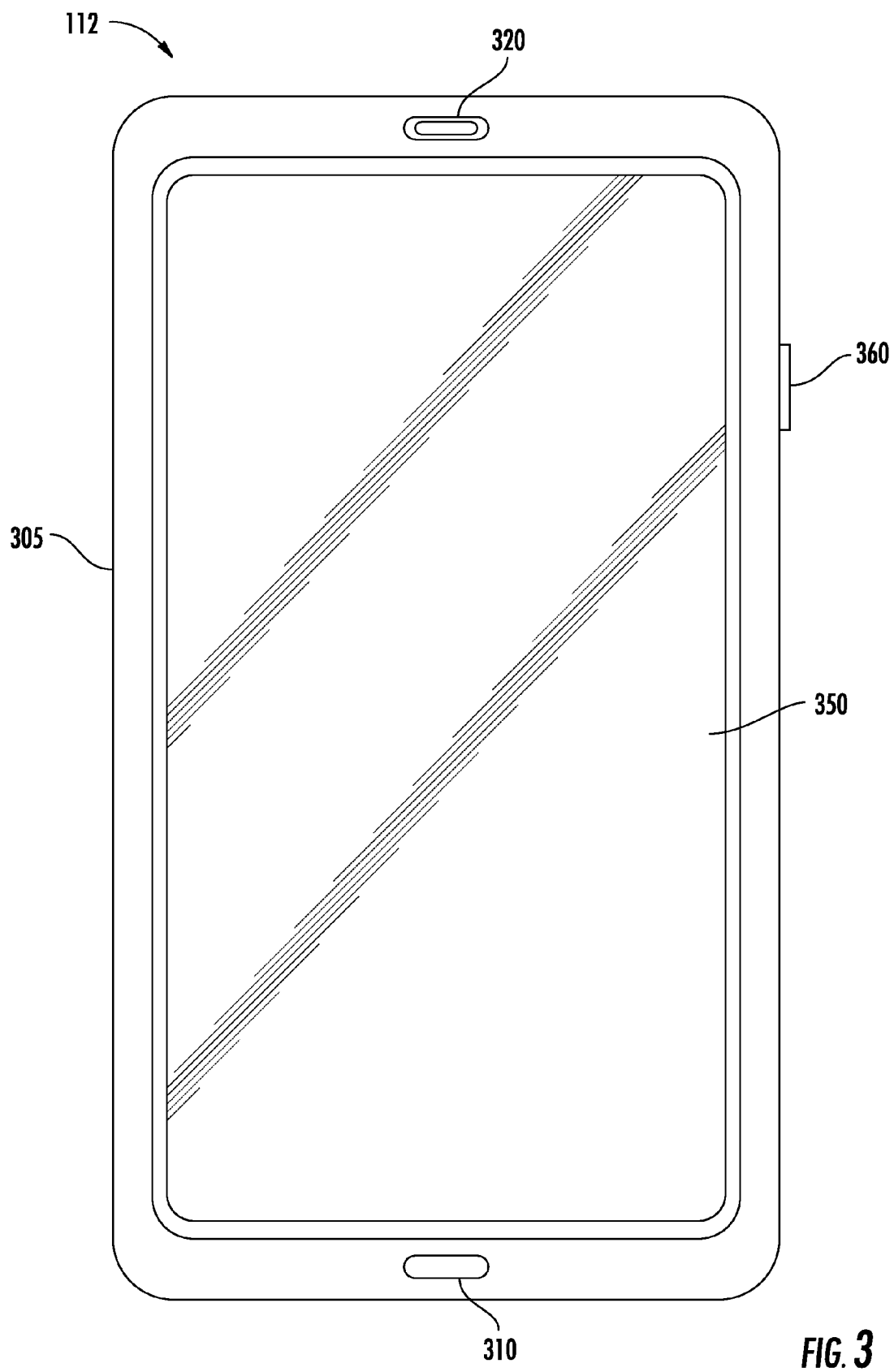
Figure 4:
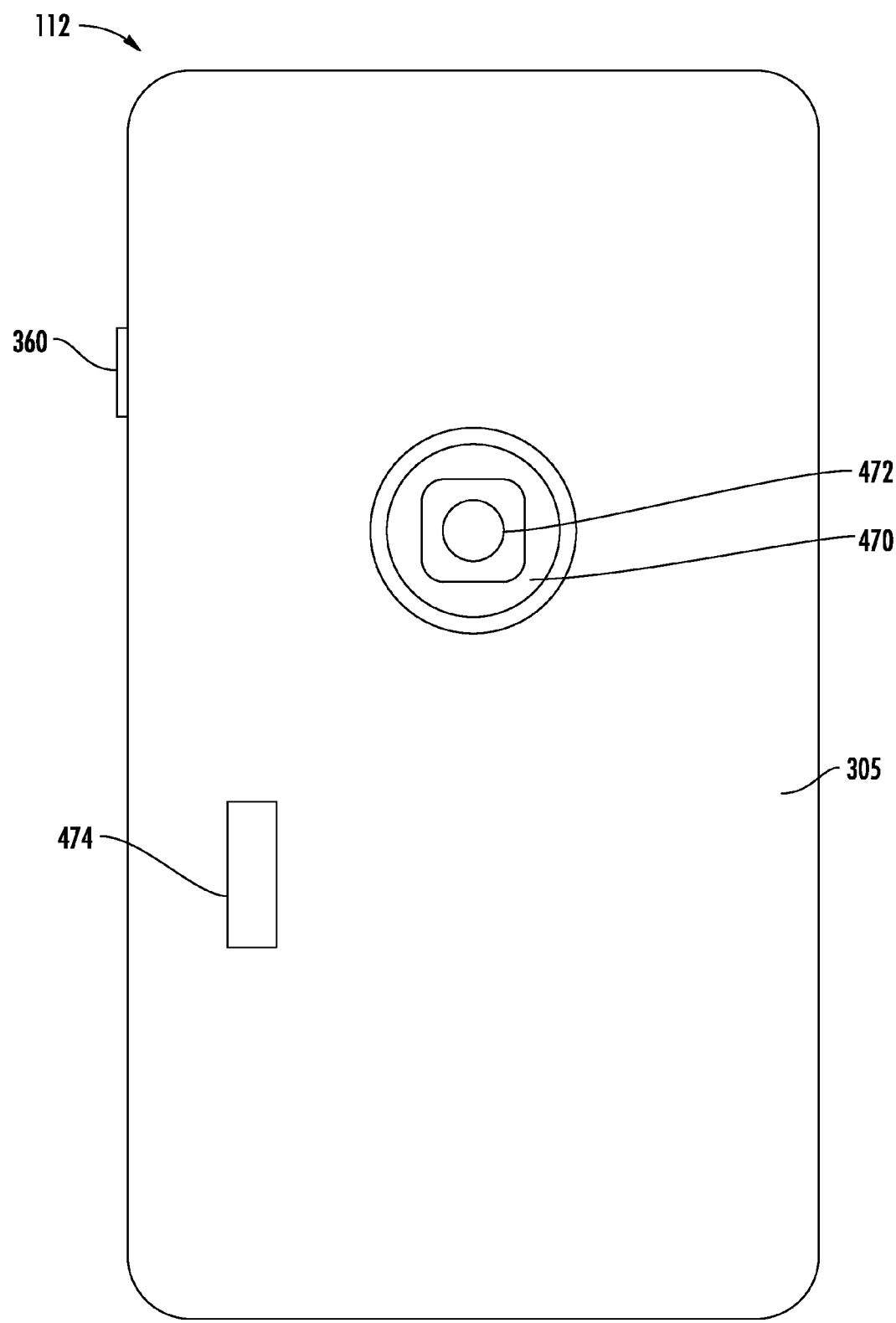
Figure 5:
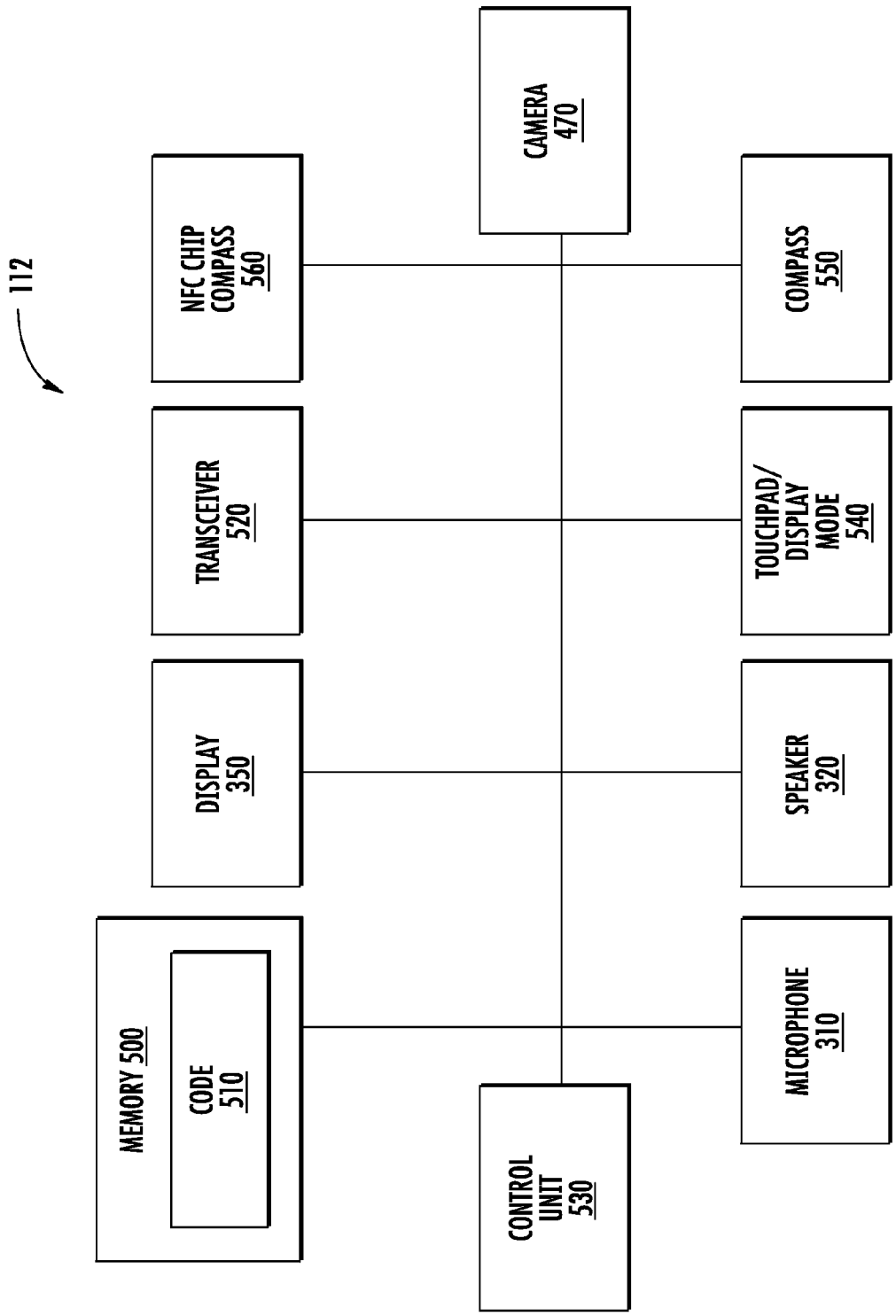

Having thus described embodiments of the invention in general terms, reference will now be made to the accompanying drawings, where:

FIG. 1 is an exemplary process flow for activating mobile device applications, in accordance with embodiments of the present invention;

FIG. 2 is another exemplary process flow for activating mobile device applications, in accordance with embodiments of the present invention;

FIG. 3 is an exemplary mobile device, in accordance with embodiments of the present invention;

FIG. 4 is a diagram illustrating a rear view of exemplary external components of the mobile device depicted in FIG. 3, in accordance with embodiments of the present invention; and FIG. 5 is a diagram illustrating exemplary internal components of the mobile device depicted in FIG. 3, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for activating mobile device applications. The invention enables a mobile device to preserve its battery life for a longer period by conditionally activating mobile device applications based on a change in magnetic field using a compass located in the mobile device.

Referring now to FIG. 1, FIG. 1 presents a process flow 100 for activating mobile device applications. The various process blocks presented in FIG. 1 may be executed in an order that is different from that presented in FIG. 1. At block 110, the process flow comprises storing a threshold change and determining a change in magnetic field using a compass located in a mobile device. At block 120, the process flow comprises comparing the change in magnetic field to a threshold change. At block 130, the process flow comprises determining whether the change in magnetic field is greater than or equal to the threshold change. At block 140, the process flow comprises in response to determining the change in magnetic field is greater than or equal to the threshold change, activating a mobile device application.

The present invention teaches a mobile device comprising a compass. The compass may be located in a near-field communication (NFC) tag or chip. Alternatively, the compass may be located in the mobile device separately from the NFC tag or chip. In some embodiments, there may be more than one compass located in the mobile device. The compass described herein is a magnetic compass. A magnetic compass comprises a magnetized pointer that is free to align itself with the Earth's magnetic field or any other magnetic field.

The change in magnetic field of the compass is triggered by bringing the mobile device in close proximity to an external magnet that has an electromagnetic field. The external magnet may be associated with a point-of-sale terminal. Alternatively or additionally, the external magnet may be associated with a readable indicia terminal (e.g., a terminal where readable indicia such as a Quick Response (QR) code is presented to the user). In some embodiments, the change in magnetic field of the compass may be determined based on the amount of displacement of a magnetic pointer associated with the compass.

As used herein, a change in magnetic field may be a change in magnitude of magnetic field (e.g., measured in tesla). Alternatively or additionally, a change in magnetic field may refer to the amount of angular displacement (e.g., in degrees or other angular or rotational units) of a compass. For example, a change in magnetic field may refer to a displacement of three to five degrees on a compass. Alternatively or additionally, a change in magnetic field may refer to the amount of linear displacement (e.g., in millimeters or other linear units) of a compass. For example, a change in magnetic field may refer to a displacement of one to two millimeters. The invention is not limited to any particular linear or angular displacement of the compass. As used herein, a magnetic field detected by the compass may refer to an amount of angular or linear displacement of the compass, or a magnetic field (e.g., measured in tesla) determined based on an angular or linear displacement of the compass.

In some embodiments, the change in magnetic field of the compass triggers activation of a mobile device application for a predetermined period (e.g., 30 seconds). In some embodiments, the change in magnetic field of the compass may need to be greater than or equal to a predetermined threshold change in order for the mobile device application to be activated. Therefore, the mobile device application may not be activated if the change in magnetic field is less than the predetermined threshold change. In some embodiments, the mobile device application may be deactivated after the predetermined period regardless of the magnetic field detected by the compass at the end of the predetermined period. In alternate embodiments, the magnetic field of the compass is determined at the end of the predetermined period. If the magnetic field is greater than or equal to a predetermined threshold magnetic field, the mobile device application continues to be active for an extended period (e.g., another 30 seconds) following the predetermined period. If the magnetic field is less than the predetermined threshold magnetic field at the end of the predetermined period, the mobile device application is deactivated. In some embodiments, the duration of the predetermined period or the extended period may be based on the type of application that is being activated. For example, the predetermined period or the extended period associated with an NFC application may be different from the predetermined period or the extended period associated with a non-NFC application (e.g., an image-capturing application).

In some embodiments, the mobile device application comprises a NFC application. The NFC application may be used for making a payment at a point-of-sale terminal. The NFC application may also be associated with a graphical user interface (GUI) that is presented to the user on the mobile device upon activation of the NFC application. In alternate embodiments, the mobile device application may be a non-NFC application. For example, the mobile device application comprises a display application or an image-capturing application.

Activating the mobile device application reduces a charge associated with a power source located in the mobile device. Therefore, by conditionally activating the mobile device application when an external magnet is determined to be in close proximity to the mobile device, the present invention enables the mobile device to preserve the charge associated with the power source located in the mobile device for a longer period.

In embodiments where there is more than one compass located in the mobile device, the change in magnetic field of each of the compasses may be determined. The change in magnetic field of each of the compasses may be added and averaged to determine an average change in magnetic field using a compass. The average change in magnetic field is then compared to the threshold change as described previously in order to determine whether to activate (or deactivate) a mobile device application.

Referring now to FIG. 2, FIG. 2 presents an alternative process flow 200 for activating mobile device applications. The various process blocks presented in FIG. 2 may be executed in an order that is different from that presented in FIG. 2. At block 210, the process flow comprises sensing an external magnet in the proximity of the mobile device. At block 220, the process flow comprises determining a change in magnetic field using a compass in a mobile device. At block 230, the process flow comprises in response to determining the change in magnetic field is greater than or equal to a threshold change stored in the mobile device, transmitting selected data from the mobile device (e.g., to a recipient terminal) such as a point-of-sale terminal via a NFC chip or tag. The selected data may comprise payment information or any other information selected by the user. Alternatively or additionally, at block 230, the process flow may comprise receiving, at a mobile device, information from a terminal (e.g., the same receiving terminal or a different sending terminal), instead of or in addition to transmitting information.

Referring now to FIG. 3, FIG. 3 is a diagram illustrating a front view of external components of an exemplary mobile device. The mobile device illustrated in FIG. 3 is a mobile communication device (e.g., portable mobile communication device such as a mobile phone). In alternate embodiments, the mobile device may be any other computing device such as a tablet computing device, a laptop computer, a watch, or the like. The mobile device includes a compass. The compass may be located in an NFC chip or tag, or may exist in the mobile device independently of the NFC chip or tag. The mobile device may perform any of the computing functions described herein.

Housing 305 may include a structure configured to contain or at least partially contain components of mobile device 112. For example, housing 305 may be formed from plastic, metal or other natural or synthetic materials or combination(s) of materials and may be configured to support microphone 310, speaker 320, display 350, and camera button 360.

Microphone 310 may include any component capable of transducing air pressure waves to a corresponding electrical signal. For example, a user may speak into microphone 310 during a telephone call. Speaker 320 may include any component capable of transducing an electrical signal to a corresponding sound wave. For example, a user may listen to music through speaker 320.

The display 350 may function as a touchpad or touchscreen. Touchpad may include any component capable of providing input to device 112. Touchpad may include a standard telephone keypad or a QWERTY keypad. Touchpad may also include one or more special purpose keys. A user may utilize touchpad for entering information, such as text or a phone number, or activating a special function, such as placing a telephone call, playing various media, setting various camera features (e.g., focus, zoom, etc.) or accessing an application.

Display 350 may include any component capable of providing visual information. For example, in one implementation, display 350 may be a liquid crystal display (LCD). In another implementation, display 350 may be any one of other display technologies, such as a plasma display panel (PDP), a field emission display (FED), a thin film transistor (TFT) display, etc. Display 350 may be utilized to display, for example, text, image, and/or video information. Display 350 may also operate as a view finder, as will be described later. A camera button 360 may also be provided that enables a user to take an image.

Since mobile device 112 illustrated in FIG. 3 is exemplary in nature, mobile device 112 is intended to be broadly interpreted to include any type of electronic device that includes an image-capturing component. For example, mobile device 112 may include a mobile phone, a personal digital assistant (PDA), a portable computer, a camera, or a watch. In other instances, mobile device 112 may include, for example, security devices or military devices. Accordingly, although FIG. 3 illustrates exemplary external components of mobile device 112, in other implementations, mobile device 112 may contain fewer, different, or additional external components than the external components depicted in FIG. 3. Additionally, or alternatively, one or more external components of mobile device 112 may include the capabilities of one or more other external components of mobile device 112. For example, display 350 may be an input component (e.g., a touch screen). The touch screen may function as a keypad or a touchpad. Additionally or alternatively, the external components may be arranged differently than the external components depicted in FIG. 3.

Referring now to FIG. 4, FIG. 4 is a diagram illustrating a rear view of external components of the exemplary mobile device. As illustrated, in addition to the components previously described, mobile device 112 may include a camera 470, a lens assembly 472, a proximity sensor 476, and a flash 474.

Camera 470 may include any component capable of capturing an image. Camera 470 may be a digital camera. Display 350 may operate as a view finder when a user of mobile device 112 operates camera 470. Camera 470 may provide for adjustment of a camera setting. In one implementation, mobile device 112 may include camera software that is displayable on display 350 to allow a user to adjust a camera setting.

Lens assembly 472 may include any component capable of manipulating light so that an image may be captured. Lens assembly 472 may include a number of optical lens elements. The optical lens elements may be of different shapes (e.g., convex, biconvex, plano-convex, concave, etc.) and different distances of separation. An optical lens element may be made from glass, plastic (e.g., acrylic), or plexiglass. The optical lens may be multicoated (e.g., an antireflection coating or an ultraviolet (UV) coating) to minimize unwanted effects, such as lens flare and inaccurate color. In one implementation, lens assembly 472 may be permanently fixed to camera 470. In other implementations, lens assembly 472 may be interchangeable with other lenses having different optical characteristics. Lens assembly 472 may provide for a variable aperture size (e.g., adjustable f-number).

Proximity sensor 476 (not shown in FIG. 4) may include any component capable of collecting and providing distance information that may be used to enable camera 470 to capture an image properly. For example, proximity sensor 476 may include a proximity sensor that allows camera 470 to compute the distance to an object. In another implementation, proximity sensor 476 may include an acoustic proximity sensor. The acoustic proximity sensor may include a timing circuit to measure echo return of ultrasonic soundwaves. In embodiments that include a proximity sensor 476, the proximity sensor may be used to determine a distance to one or more moving objects, which may or may not be in focus, either prior to, during, or after capturing of an image frame of a scene. In some embodiments, proximity of an object to the mobile device may be calculated during a post-processing step (e.g., after capturing the image).

Flash 474 may include any type of light-emitting component to provide illumination when camera 470 captures an image. For example, flash 474 may be a light-emitting diode (LED) flash (e.g., white LED) or a xenon flash. In another implementation, flash 474 may include a flash module.

Although FIG. 4 illustrates exemplary external components, in other implementations, mobile device 112 may include fewer, additional, and/or different components than the exemplary external components depicted in FIG. 4. For example, in other implementations, camera 470 may be a film camera. Additionally, or alternatively, depending on mobile device 112, flash 474 may be a portable flashgun. Additionally, or alternatively, mobile device 112 may be a single-lens reflex camera. In still other implementations, one or more external components of mobile device 112 may be arranged differently.

Referring now to FIG. 5, FIG. 5 is a diagram illustrating internal components of the exemplary mobile device. As illustrated, mobile device 112 may include microphone 310, speaker 320, display 350, camera 470, a memory 500, a transceiver 520, and a control unit 530. Additionally, the control unit 530 may enable a user to switch between touchpad or display mode 540. In touchpad mode, the display 350 functions as at least one of an input device (e.g., a numeric keypad or a QWERTY touchpad) or an output device. In display mode, the display 350 functions as an output device.

The near-field communication (NFC) Chip 360 comprises an active or passive chip that enables data to be transmitted from the mobile device 112 to a receiving terminal (or received at the mobile device 112 from a sending terminal). An active chip is activated using a power source located in the mobile device 112. A passive chip is activated using an electromagnetic field of the receiving terminal. The NFC Chip 360 may comprise a compass as presented in FIG. 5. Alternatively or additionally, the compass 550 may exist in the mobile device independently of the NFC Chip 360.

Memory 500 may include any type of storing component to store data and instructions related to the operation and use of mobile device 112. For example, memory 500 may include a memory component, such as a random access memory (RAM), a read only memory (ROM), and/or a programmable read only memory (PROM). Additionally, memory 500 may include a storage component, such as a magnetic storage component (e.g., a hard drive) or other type of computer-readable or computer-executable medium. Memory 500 may also include an external storing component, such as a Universal Serial Bus (USB) memory stick, a digital camera memory card, and/or a Subscriber Identity Module (SIM) card.

Memory 500 may include a code component 510 that includes computer-readable or computer-executable instructions to perform one or more functions. These functions include initiating and/or executing the processes described herein. The code component 510 may work in conjunction with one or more other hardware or software components associated with the mobile device 112 to initiate and/or execute the processes described herein. Additionally, code component 510 may include computer-readable or computer-executable instructions to provide other functionality other than as described herein.

Transceiver 520 may include any component capable of transmitting and receiving information wirelessly or via a wired connection. For example, transceiver 520 may include a radio circuit that provides wireless communication with a network or another device.

Control unit 530 may include any logic that may interpret and execute instructions, and may control the overall operation of mobile device 112. Logic, as used herein, may include hardware, software, and/or a combination of hardware and software. Control unit 530 may include, for example, a general-purpose processor, a microprocessor, a data processor, a co-processor, and/or a network processor. Control unit 530 may access instructions from memory 500, from other components of mobile device 112, and/or from a source external to mobile device 112 (e.g., a network or another device).

Control unit 530 may provide for different operational modes associated with mobile device 112. Additionally, control unit 530 may operate in multiple modes simultaneously. For example, control unit 530 may operate in a camera mode, a music player mode, and/or a telephone mode. For example, when in camera mode, face-detection and tracking logic may enable mobile device 112 to detect and track multiple objects (e.g., the presence and position of each object's face) within an image to be captured. The face-detection and tracking capability of mobile device 112 will be described in greater detail below.

Although FIG. 5 illustrates exemplary internal components, in other implementations, mobile device 112 may include fewer, additional, and/or different components than the exemplary internal components depicted in FIG. 5. For example, in one implementation, mobile device 112 may not include transceiver 520. In still other implementations, one or more internal components of mobile device 112 may include the capabilities of one or more other components of mobile device 112. For example, transceiver 520 and/or control unit 530 may include their own on-board memory.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for activating a Near Field Communication (NFC) application on a mobile device, the method comprising:
    providing for the mobile device having a processor and a compass in communication with the processor;
    storing, in a memory component, a magnetic field threshold change;
    determining a change in magnetic field using the compass;
    comparing, by the processor, the change in magnetic field to the magnetic field threshold change;
    determining, by the processor, that the change in magnetic field is greater than or equal to the magnetic field threshold change;
    in response to determining that the change in magnetic field is greater than or equal to the magnetic field threshold change, activating, by the processor, the NFC application for a predetermined period of time; and
    deactivating, by the processor, the NFC application after the predetermined period of time.

2. The method of claim 1, wherein the compass is located in a NFC tag or chip.

3. The method of claim 1, wherein the compass is located in the mobile device but not in an NFC tag or chip.

4. The method of claim 1, wherein the compass comprises at least two compasses.

5. The method of claim 1, wherein activating the NFC application for a predetermined period of time reduces a charge associated with a power source located in the mobile device.

6. The method of claim 1, wherein the mobile device comprises a portable mobile communication device.

7. The method of claim 1, wherein the compass comprises at least two compasses, and wherein the change in magnetic field comprises an average change in magnetic field detected by the at least two compasses.

8. The method of claim 1, wherein the change in magnetic field is triggered by bringing the mobile device in close proximity to an external magnet.

9. The method of claim 8, wherein the external magnet is associated with a point-of-sale terminal.

10. The method of claim 8, wherein the external magnet is associated with a readable indicia terminal.

11. The method of claim 1, wherein deactivating the NFC application after the predetermined period is based on the magnetic field detected by the compass at the end of the predetermined period being less than the magnetic field threshold change.

12. The method of claim 1, further comprising overriding the deactivation and continuing to activate, by the processor, the NFC application after the predetermined period based on the magnetic field detected by the compass at the end of the predetermined period being greater than or equal to the magnetic field threshold change.

13. The method of claim 1, wherein determining the change in magnetic field comprises determining an amount of displacement of a magnetic pointer associated with the compass.

14. The method of claim 1, further comprising initiating presentation of a graphical user interface on a display of the mobile device upon activation of the NFC application.

15. An apparatus for activating a Near Field Communication (NFC) application on a wireless device, the apparatus comprising:
- a memory;
- a compass
- a processor in communication with the memory and the compass; and
- a module stored in the memory, executable by the processor, and configured to:
  - store, in the memory a magnetic field threshold change,
  - determine a change in magnetic field using the compass,
  - compare the change in magnetic field to the magnetic field threshold change,
  - determine that the change in magnetic field is greater than or equal to the magnetic field threshold change,
  - in response to determining that the change in magnetic field is greater than or equal to the magnetic field threshold change, activate the NFC application for a predetermined period of time, and
  - deactivate the NFC application after the predetermined period of time.

16. A computer program product for activating a Near Field Communication (NFC) application on a mobile terminal, the computer program product comprising:
- a non-transitory computer-readable medium comprising a set of codes for causing a computer to:
  - store a magnetic field threshold change,
  - determine a change in magnetic field using the compass located in a mobile device;
  - compare the change in magnetic field to the magnetic field threshold change;
  - determine that the change in magnetic field is greater than or equal to the magnetic field threshold change;
  - in response to determining that the change in magnetic field is greater than or equal to the magnetic field threshold change, activate the NFC application for a predetermined period of time; and
  - deactivate the NFC application after the predetermined period of time.

* * * * *